(12) United States Patent
Huang

(10) Patent No.: US 7,743,652 B1
(45) Date of Patent: Jun. 29, 2010

(54) TIRE PRESSURE DETECTOR WITHOUT THE RISK OF CAUSING A LEAKY TIRE

(75) Inventor: Teng-Wen Huang, No. 4, Lane 30, Wu Chuan St., Panchiao City, Taipei Hsien (TW)

(73) Assignee: Teng-Wen Huang, Taipei Hsien (TW)

( * ) Notice: Subject to any disclaimer, the term of this patent is extended or adjusted under 35 U.S.C. 154(b) by 24 days.

(21) Appl. No.: 12/366,661

(22) Filed: Feb. 6, 2009

(30) Foreign Application Priority Data

Jan. 9, 2009 (TW) .............................. 98100765 A

(51) Int. Cl.
*B60C 23/02* (2006.01)
(52) U.S. Cl. ................................................ 73/146.2
(58) Field of Classification Search ........ 73/146–146.8; 340/442–447
See application file for complete search history.

(56) References Cited

U.S. PATENT DOCUMENTS 7,251,993 B1 * 8/2007 Okubo et al. .............. 73/146.4
7,317,381 B2 * 1/2008 Miyazaki ............... 340/426.33
7,421,891 B2 * 9/2008 Katou ........................ 73/146.8
7,509,969 B2 * 3/2009 Huang ......................... 137/226
7,565,832 B2 * 7/2009 Huang ....................... 73/146.8

* cited by examiner

*Primary Examiner*—Jewel Thompson
(74) *Attorney, Agent, or Firm*—CKC & Partners Co., Ltd.

(57) ABSTRACT

A tire pressure detector without the risk of causing a leaky tire includes a base having a forward projected and externally threaded annular wall and an annular limit wall to define an annular groove therebetween; a mating cover having an internally threaded annular wall for screwing to the externally threaded annular wall of the base with a free end of the annular wall received in the annular groove to press against an airtight seal ring set in the annular groove, such that an airtight space is defined in and between the assembled cover and base; a tire pressure detecting assembly being receiving in the airtight space; and a valve control assembly being mounted on the base to locate between the base and the mating cover. The annular limit wall prevents the cover from moving and deforming at the screwed portion to ensure good air-tightness between the cover and the base.

4 Claims, 6 Drawing Sheets

TIRE PRESSURE DETECTOR WITHOUT THE RISK OF CAUSING A LEAKY TIRE

RELATED APPLICATIONS

This application claims priority to Taiwan Application Serial Number 98100765, filed Jan. 9, 2009, which is herein incorporated by reference.

FIELD OF THE INVENTION

The present invention relates to a tire pressure detector, and more particularly, to a tire pressure detector that can be connected to a tire valve for detecting tire pressure of a tire without the risk of causing a leaky tire.

BACKGROUND OF THE INVENTION

A tire pressure detector is designed for connecting to a tire valve on a tire of a car for detecting tire pressure, so that a user can timely obtain information about the tire pressure to drive the car safely.

FIG. 1 is an assembled sectional view of a conventional tire pressure detector, which includes a base 91 having a first end screwed to an outer side of a tire valve, and a mating cover 92 screwed to an outer side of an opposite second end of the base 91 through engagement of external threads 93 on the second end of the base 91 with internal threads 94 of the cover 92. An airtight seal ring 95 is disposed between the base 91 and the mating cover 92 at the screwed portion, so that the base 91 and the cover 92 screwed to each other together define an airtight space 96 in and between them. All the necessary components of the tire pressure detector, such as a pressure detecting unit for detecting tire pressure, a signal transmitting unit for sending out a signal indicating the detected tire pressure, and a battery for supplying electric power to the pressure detecting unit, are received in the airtight space 96. Moreover, a valve control assembly 97 is fitted in the first end of the base 91 to locate between the base 91 and the tire valve. The valve control assembly 97 is in contact with the tire valve to thereby normally open the tire valve, allowing air in the tire to flow through the tire valve and the valve control assembly 97 into the airtight space 96, so that the pressure detecting unit in the airtight space 96 can detect the tire pressure from the air flowed into the airtight space 96.

In the above-structured conventional tire pressure detector, the cover 92 is connected to the base 91 through engagement of the internal threads 93 of the cover 92 with the external threads 94 of the base 91. There is not any limiting element provided outside the cover 92. When the cover 92 deforms due to an external force applied thereto or changes in ambient temperature, a peripheral wall of the cover 92 tends to expand and deform because it is not limited by any means. The deformed cover 92 could not air-tightly connect to the base 91 and gaps will exist between the cover 92 and the base 91. Air flowed from the tire into the airtight space 96 tends to continuously leak out via these gaps, which forms a threat to the safety in driving the car.

Moreover, the whole tire pressure detector and the tire valve are located outside the tire to expose to external environment. When the tire is impacted by an external force while the car is driving or is parked, the cover 92 of the tire pressure detector is apt to loosen and finally separate from the base 91. In the conventional tire pressure detector, the valve control assembly 97 is mounted on the base 91 to locate between the base 91 and the tire valve. In the case the base 91 of the tire pressure detector is still screwed to the tire valve while the cover 92 has separated from the base 91, the valve control assembly 97 mounted on the base 91 will keep contacting with the tire valve to push the latter open. Under this situation, air in the tire will continuously flow through the tire valve and the valve control assembly 97 into an open space to cause a leaky tire, which is highly dangerous to a car in moving.

Therefore, the conventional tire pressure detector has low applicability and requires improvement.

SUMMARY OF THE INVENTION

A primary object of the present invention is to provide a tire pressure detector without the risk of causing a leaky tire to ensure safe and practical use thereof.

To achieve the above and other objects, the tire pressure detector without the risk of causing a leaky tire according to a preferred embodiment of the present invention can be connected to a tire valve on a tire of a car for detecting tire pressure of the tire, and includes a base having a forward projected and externally threaded annular wall and an annular limit wall, which together define an annular groove therebetween; a mating cover having an internally threaded annular wall for correspondingly screwing to the externally threaded annular wall of the base with a free end of the annular wall of the cover received in the annular groove to press against an airtight seal ring set in the annular groove, such that an airtight space is defined in and between the assembled cover and base; a tire pressure detecting assembly being receiving in the airtight space; and a valve control assembly being mounted on the base to locate between the base and the mating cover. The annular limit wall located outside and around the annular wall of the cover helps in maintaining the annular wall of the cover in its original position and shape, and thereby protects the cover against deformation at the screwed portion to ensure good air-tightness between the cover and the base, and prevents air in the tire from leaking out via a joint of the cover and the base.

Preferably, the airtight seal ring is set in the annular groove corresponding to the free end of the annular wall of the cover, such that when the cover is fully screwed to the base, the free end of the annular wall of the cover can tightly press against the airtight seal ring to ensure good air-tightness between the base and the cover.

Moreover, the base further has a through hole communicating with the airtight space and a recess formed in one side of the base opposite to the cover to communicate with the through hole. And, the valve control assembly includes a valve control and an airtight gasket. The valve control includes a hollow main body and a flange portion. The main body has an air passage portion and a head portion integrally connected to each other. The air passage portion is fitted in the airtight space, the through hole, and the recess, and the head portion is located in the recess. The head portion has an inner diameter smaller than that of the air passage portion. The flange portion is radially outward extended from an outer periphery of the main body and is located in the airtight space to limit a position of the valve control in the tire pressure detector. The airtight gasket is fitted in the recess between the main body of the valve control and the base to prevent air in the tire from leaking out via the main body of the valve control or the recess of the base. Since the flange portion of the valve control is located in the airtight space to face toward the cover, the valve control will separate from the base and no longer pushes against the tire valve to open the same when the cover is loosened and separated from the base due to an external force. Therefore, the risk of a leaky tire caused by the valve control of the tire pressure detector is eliminated.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
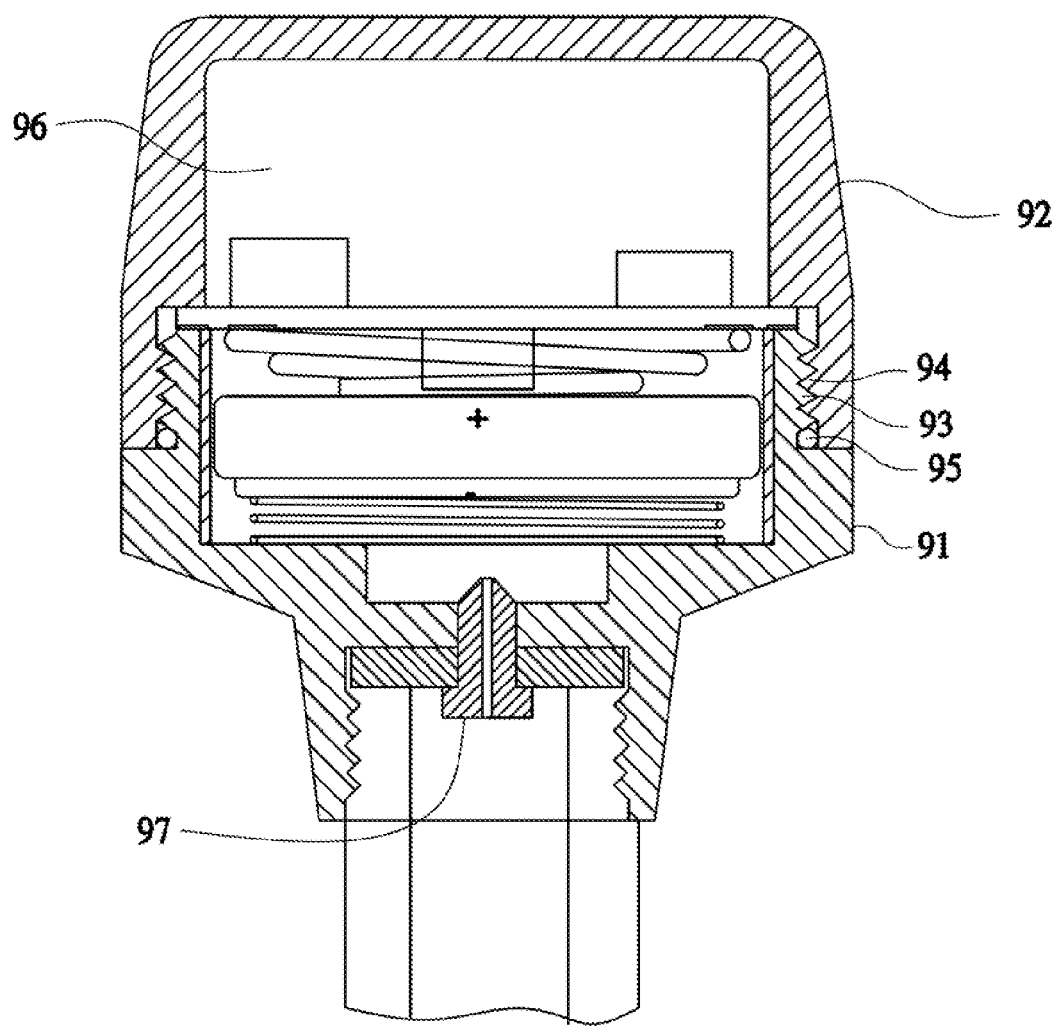
FIG. 1 is an assembled sectional view of a conventional tire pressure detector.
Figure 2:
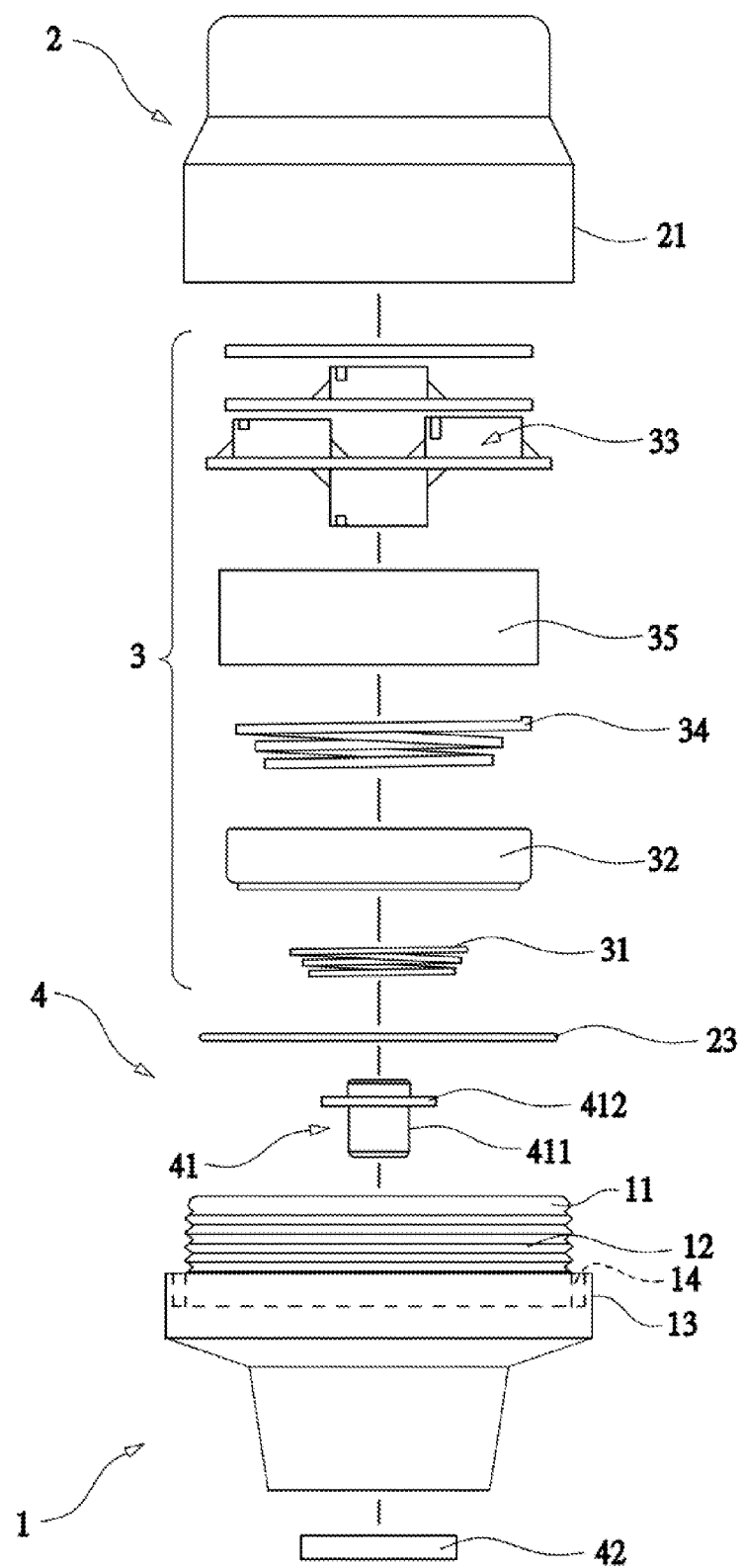
FIG. 2 is an exploded side view of a tire pressure detector without the risk of causing a leaky tire according to a preferred embodiment of the present invention.
Figure 3:
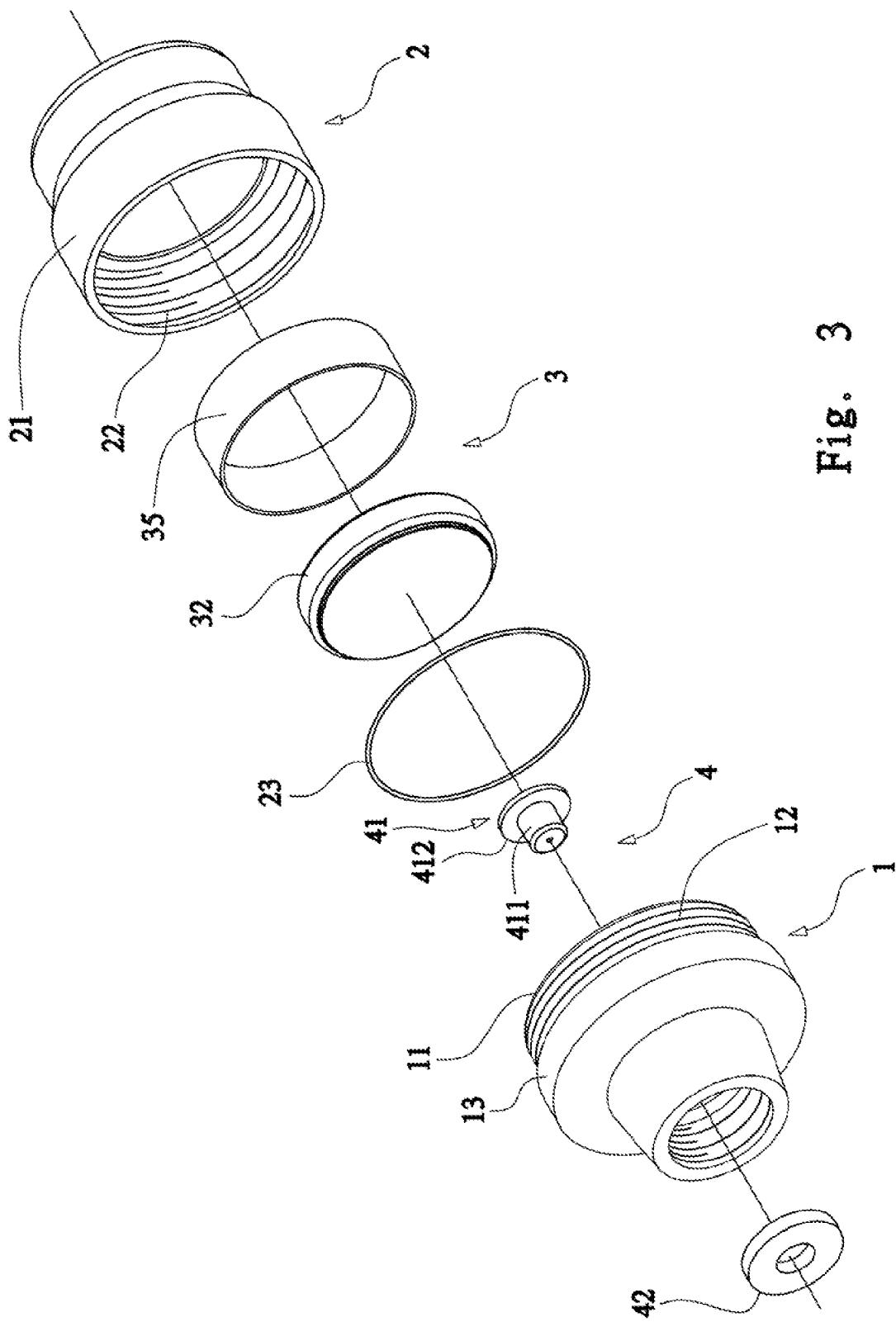
FIG. 3 is an exploded perspective view of the tire pressure detector of FIG. 2 with some parts thereof omitted from the drawing.
Figure 4:
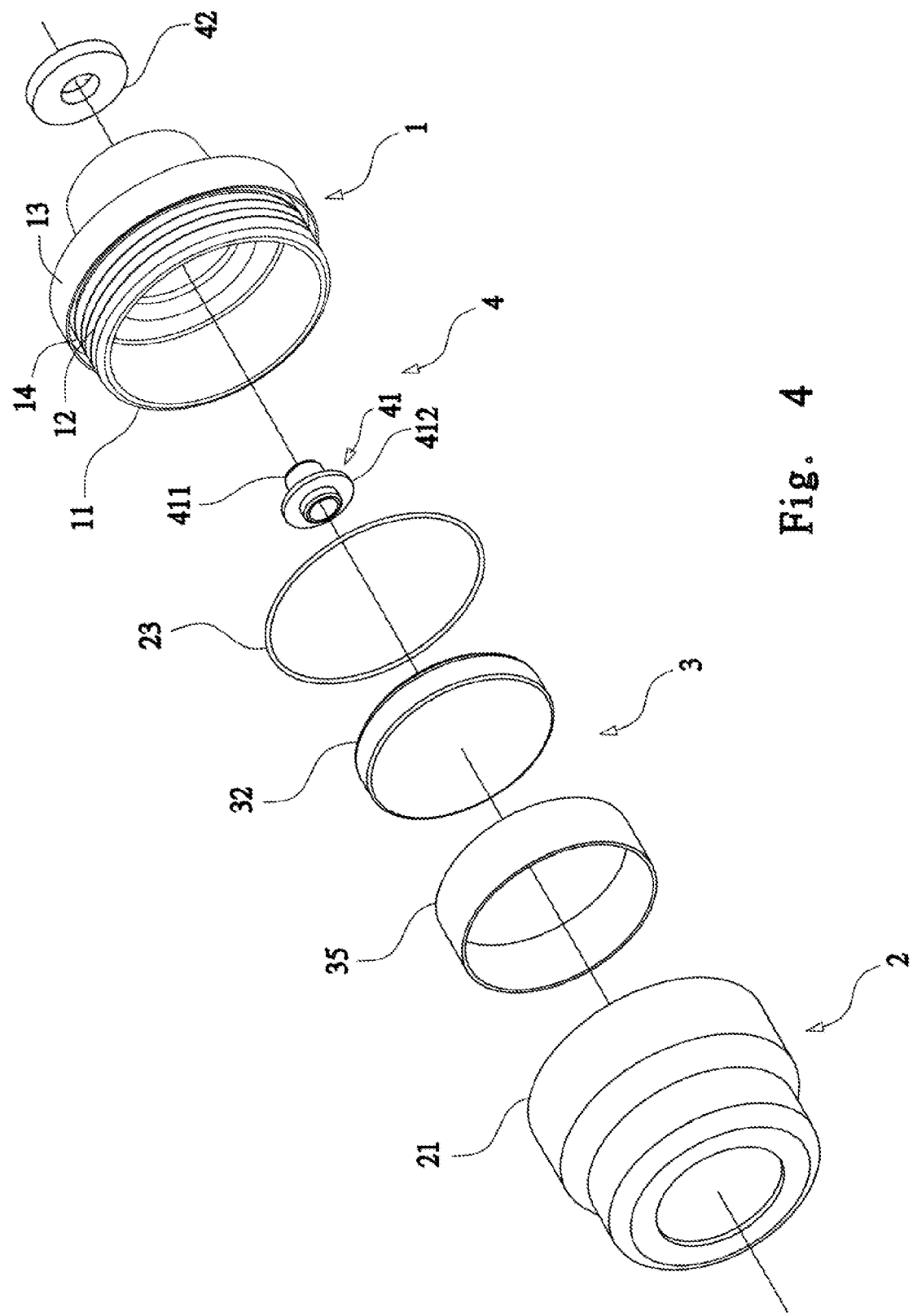
FIG. 4 is another exploded perspective view of the tire pressure detector of FIG. 2 viewed from another angle, also with some parts thereof omitted from the drawing.
Figure 5:
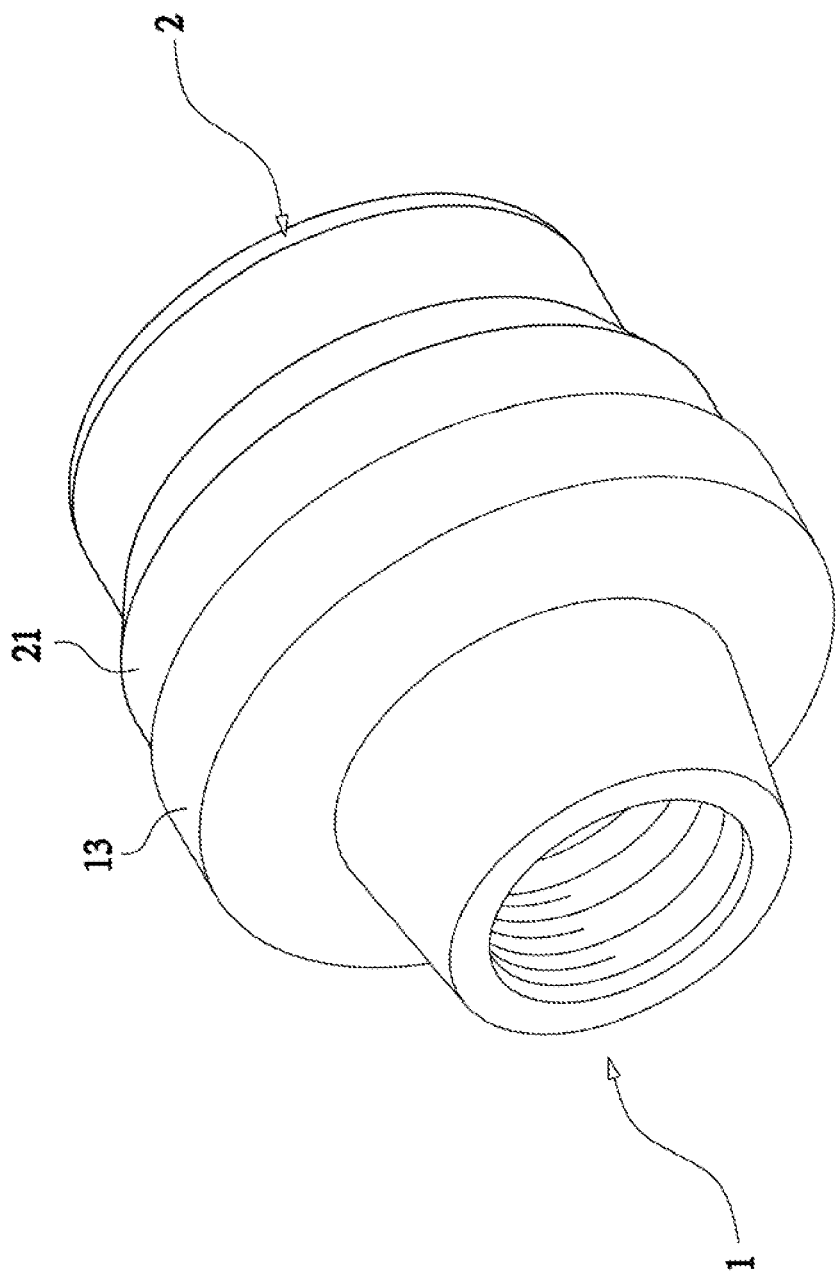
FIG. 5 is an assembled perspective view of the tire pressure detector of FIG. 2.
Figure 6:
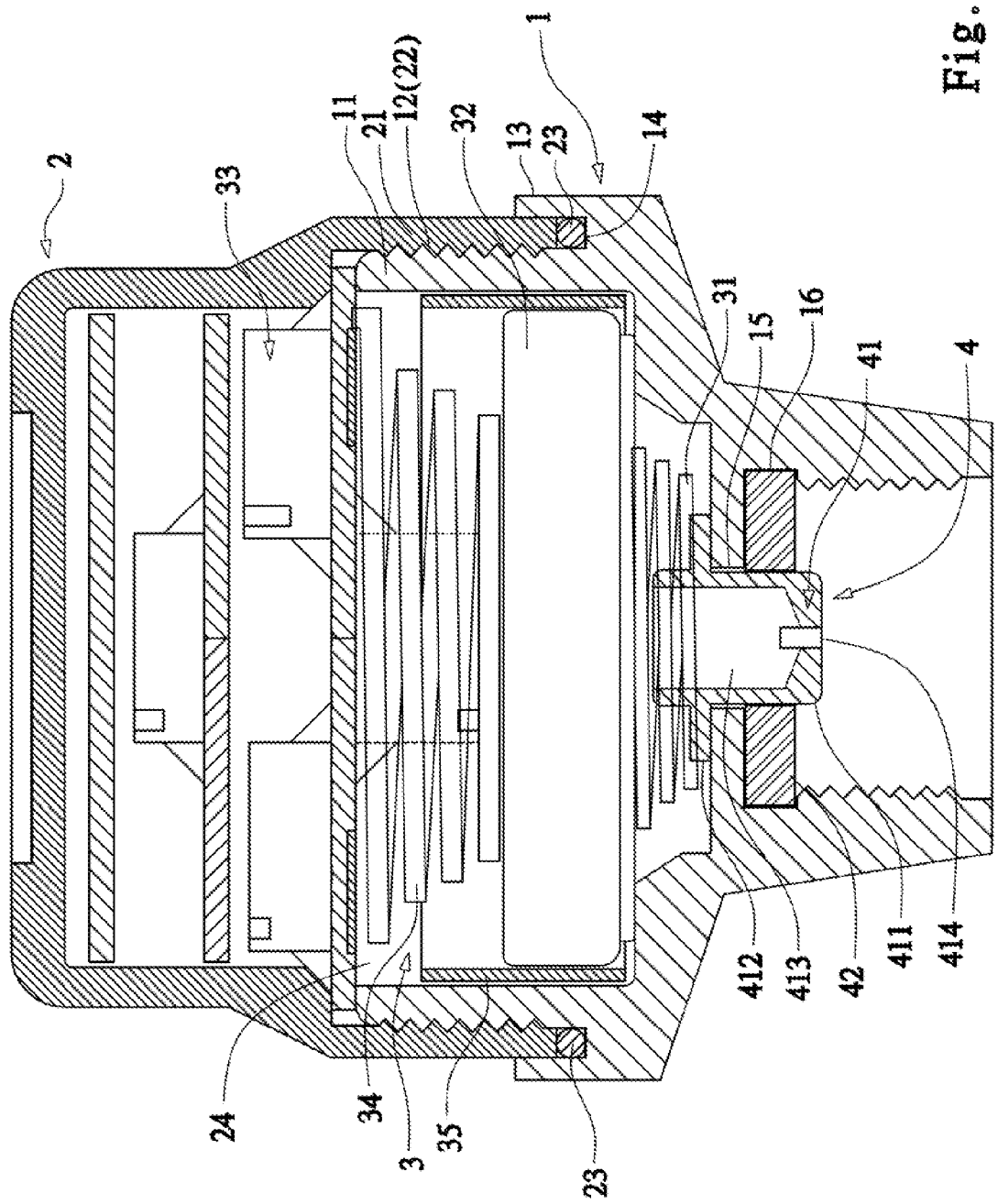
FIG. 6 is an assembled sectional view of the tire pressure detector of FIG. 2.

Please refer to FIGS. 2 through 6, in which a tire pressure detector without the risk of causing a leaky tire according to a preferred embodiment of the present invention is shown. The tire pressure detector is internally provided with a valve control assembly and is connected to a tire valve (not shown) on a tire of a car to normally push open the tire valve, so that air in the tire can flow via the tire valve and the valve control assembly into the tire pressure detector, allowing a user to detect the tire pressure.

In the illustrated preferred embodiment, the tire pressure detector of the present invention includes an electrically conducting base 1, a mating cover 2, a tire pressure detecting assembly 3, and a valve control assembly 4.

The base 1 has a forward projected annular wall 11 with external threads 12 provided on an outer wall surface thereof, and an annular limit wall 13 located outside the projected wall 11, such that an annular groove 14 is defined between the limit wall 13 and the projected wall 11.

The cover 2 has an annular wall 21 corresponding to the projected wall 11 of the base 1 and is provided on an inner wall surface with internal threads 22, such that the cover 2 can be screwed to the projected wall 11 of the base 1 via engagement of the internal threads 22 with the external threads 12. When the cover 2 has been fully screwed to the base 1, a free end of the annular wall 21 of the cover 2 is received in the annular groove 14 on the base 1. That is, the annular limit wall 13 on the base 1 is located outside the annular wall 21 of the cover 2 when the cover 2 has been fully screwed to the base 1.

An airtight seal ring 23 is set between the base 1 and the mating cover 2 at the screwed portion. For example, the airtight seal ring 23 can be set in the annular groove 14, such that when the cover 2 is fully screwed to the base 1, the free end of the annular wall 21 of the cover 2 is tightly pressed against the airtight seal ring 23 to further ensure an airtight relation between the base 1 and the cover 2. After the cover 2 has been fully screwed to the base 1, an airtight space 24 is defined in and between them.

When the cover 2 has been screwed to the base 1, the annular limit wall 13 is located outside the annular wall 21 of the cover 2 to help in maintaining the annular wall 21 in its original position and shape. Therefore, the annular wall 21 for screwing to the base 1 is not easily subjected to deformation due to pressure applied thereto or changes in ambient temperature and a good airtight relation can be ensured between the cover 2 and the base 1 at the screwed portion. With these arrangements, the risk of having a leaky tire due to the tire pressure detector mounted thereto is eliminated. That is, the tire pressure detector according to the present invention is safe for use and provides good applicability.

The base 1 further has a through hole 15 communicating with the airtight space 24, and a recess 16 formed in one side of the base 1 opposite to the cover 2 and communicating with the through hole 15.

In an operable embodiment of the present invention, the tire pressure detecting assembly 3 includes a first conducting elastic element 31, a battery 32, a tire pressure detecting unit 33, a second conducting elastic element 34, and an insulating sleeve 35. The whole tire pressure detecting assembly 3 is received in the airtight space 24. More specifically, the first conducting elastic element 31 is located in the airtight space 24 between a top of the through hole 15 and the battery 32 to always maintain good electric connection of the battery 32 to the base 1 while allowing air in the tire to smoothly flow through the through hole 15 into the airtight space 24. The battery 32 is electrically connected at a negative electrode to the base 1, and at a positive electrode to the tire pressure detecting unit 33 via the second conducting elastic element 34. With these arrangements, the battery 32 can supply power to the tire pre sure detecting unit 33. The tire pressure detecting unit 33 includes a circuit board, on which a pressure detecting means, a temperature detecting means, a microprocessor, a signal transmitter, etc. are mounted to electrically connect to the circuit board. Since these components are known in the art, they are not discussed in details herein. The second conducting elastic element 34 is located between the battery 32 and the tire pressure detecting unit 33 to stably hold the battery 32 in place and enable good electric connection of the battery 32 to the tire pressure detecting unit 33. The insulating sleeve 35 is fitted around the battery 32 to locate between the battery 32 and the base 1, so as to prevent any sideward electrical contact of the battery 32 with the base 1.

However, it is to be noted the tire pressure detecting assembly 3 is not limited to the components disclosed in the illustrated preferred embodiment, but can have different structure and components according to actual need.

Please refer to FIGS. 2, 3, 4, and 6 at the same time. The valve control assembly 4 includes a valve control 41 and an airtight gasket 42.

The valve control 41 has a hollow main body 411 and a flange portion 412.

The main body 411 includes an air passage portion 413 and a head portion 414 that are integrally connected to each other. The air passage portion 413 is fitted in the airtight space 24, the through hole 15, and the recess 16. The head portion 414 is located in the recess 16, and has an inner diameter smaller than that of the air passage portion 413 for correspondingly pressing against a valve needle in the tire valve (not shown), so that air in the car tire can flow through the tire valve, the head portion 414, and the air passage portion 413 into the airtight space 24.

The flange portion 412 is radially outward extended from an outer periphery of the main body 411, and is located in the airtight space 24. The flange portion 412 has a cross-sectional area larger than a diameter of the through hole 15 and can therefore restrict a position of the main body 411 in the base 1. That is, the valve control 41 is assembled to the through hole 15 on the base 1 from the side with the airtight space 24, so that the flange portion 412 is stopped by the through hole 15 from moving into the recess 16 but to locate in the airtight space 24 above the through hole 15.

The airtight gasket 42 is fitted in the recess 16 to be tightly held between the main body 411 and the base 1, so as to prevent air in the car tire from leaking out via the main body 411 or the recess 16 of the base 1.

With the above mechanism design of the valve control assembly 4, the valve control 41 has a flange portion 412 with a relatively larger outer diameter, and the flange portion 412 is located in the airtight space 24 to face toward the cover 2. When the tire is impacted by an external force while the car is moving or is parked, and the cover 2 of the tire pressure detector becomes loosened and separated from the base 1 under the impact, the components received in the airtight space 24, including the valve control 91, will separate from the airtight space 24 via an open top of the base 1 that is no longer closed by the cover 2. At this point, the valve needle in the tire valve corresponding to that tire pressure detector is no longer pushed by the head portion 419 of the valve control 41 and thereby returns to a closed state. Therefore, the risk of a leaky tire caused by the valve control 41 can be avoided, making the tire pressure detector of the present invention safe and practical for use.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A tire pressure detector without the risk of causing a leaky tire, being connected to a tire valve on a tire of a car for detecting tire pressure of the tire, comprising:
    a base having a forward projected and externally threaded annular wall, an annular limit wall located outside and around the forward projected annular wall, and an annular groove formed between the annular limit wall and the forward projected annular wall;
    a mating cover having an internally threaded annular wall corresponding to the forward projected and externally threaded annular wall of the base, such that the cover can be tightly screwed to the base with a free end of the annular wall of the cover received in the annular groove; and the cover and the base screwed to each other having an airtight seal ring set therebetween at the screwed portion, so that an airtight space can be defined in and between them;
    a tire pressure detecting assembly being received in the airtight space; and
    a valve control assembly being mounted on the base to locate between the base and the cover.

2. The tire pressure detector without the risk of causing a leaky tire as claimed in claim 1, wherein the airtight seal ring is set in the annular groove corresponding to the free end of the annular wall of the cover having been fully screwed to the base.

3. The tire pressure detector without the risk of causing a leaky tire as claimed in claim 1, wherein the base further has a through hole communicating with the airtight space and a recess formed in one side of the base opposite to the mating cover and communicating with the through hole, and the valve control assembly includes a valve control and an airtight gasket;
    the valve control including:
        a hollow main body having an air passage portion and a head portion being integrally connected to each other; the air passage portion being fitted in the airtight space, the through hole, and the recess; the head portion being located in the recess and having an inner diameter smaller than that of the air passage portion; and
        a flange portion being radially outward extended from an outer periphery of the main body and being located in the airtight space for restricting a position of the main body in the base; and
    the airtight gasket being fitted in the recess to be tightly held between the main body of the valve control and the base, so as to prevent air in the car tire from leaking out via the main body of the valve control or the recess of the base.

4. The tire pressure detector without the risk of causing a leaky tire as claimed in claim 2, wherein the base further has a through hole communicating with the airtight space and a recess formed in one side of the base opposite to the mating cover and communicating with the through hole, and the valve control assembly includes a valve control and an airtight gasket;
    the valve control including:
        a hollow main body having an air passage portion and a head portion being integrally connected to each other; the air passage portion being fitted in the airtight space, the through hole, and the recess; the head portion being located in the recess and having an inner diameter smaller than that of the air passage portion; and
        a flange portion being radially outward extended from an outer periphery of the main body and being located in the airtight space for restricting a position of the main body in the base; and
    the airtight gasket being fitted in the recess to be tightly held between the main body of the valve control and the base, so as to prevent air in the car tire from leaking out via the main body of the valve control or the recess of the base.

* * * * *